United States Patent
Hansson

(10) Patent No.: US 6,623,216 B2
(45) Date of Patent: Sep. 23, 2003

(54) TOOL HOLDER HAVING AN INSERT SEAT WITH A SCREW-ADJUSTED SIDE SURFACE

(75) Inventor: Per Hansson, Gävle (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/058,335

(22) Filed: Jan. 30, 2002

(65) Prior Publication Data

US 2002/0114674 A1 Aug. 22, 2002

(30) Foreign Application Priority Data

Jan. 30, 2001 (SE) .............................................. 0100251

(51) Int. Cl.[7] .......................... B23B 29/00; B23P 15/30
(52) U.S. Cl. .......................................... 407/83; 407/87
(58) Field of Search ............................. 407/83, 89, 86, 407/87, 88, 103, 104, 107

(56) References Cited

U.S. PATENT DOCUMENTS

| | | | |
|---|---|---|---|
| 3,623,201 A | | 11/1971 | Gustafson |
| 4,035,890 A | | 7/1977 | Eriksson et al. |
| 4,600,341 A | * | 7/1986 | Board ......................... 407/104 |
| 4,714,384 A | * | 12/1987 | Lagerberg .................... 407/62 |
| 4,848,198 A | * | 7/1989 | Royal et al. ................... 407/11 |
| 6,270,294 B1 | | 8/2001 | Sjöö et al. |

FOREIGN PATENT DOCUMENTS

| | | |
|---|---|---|
| DE | 25 44 877 | 4/1976 |
| DE | 37 14 055 | 11/1987 |

* cited by examiner

*Primary Examiner*—Willmon Fridie, Jr.
(74) *Attorney, Agent, or Firm*—Burns, Doane, Swecker & Mathis, LLP

(57) ABSTRACT

A tool holder for mounting a cutting insert for chip removing machining includes a head on which is disposed an insert-receiving seat having an insert-support surface. A plate-shaped member is detachably mounted on the head and includes first and second fingers. The fingers include respective first and second side surfaces forming a recess therebetween. The side surfaces are arranged in upstanding relationship with the insert-support surface to form therewith the insert-receiving seat. The first finger includes a through-slot and is flexible, wherein the first side surface is elastically displaceable relative to the second side surface. An intermediate portion of each of the side surfaces includes a recess wherein each of the side surfaces defines a plurality of spaced-apart contact areas. The plate-shaped member and the head include serrations which are in meshing relationship, except at locations which permit the first finger to be elastically deformed relative to the second finger, by an adjusting screw.

16 Claims, 4 Drawing Sheets

TOOL HOLDER HAVING AN INSERT SEAT WITH A SCREW-ADJUSTED SIDE SURFACE

This application claims priority under 35 U.S.C. §§119 and/or 365 to patent application Ser. No. 0100251-8 filed in Sweden on Jan. 30, 2001.

1. Technical Field of the Invention

The present invention relates to a tool holder for cutting inserts for chip removing machining, the tool holder comprising a head on which is disposed an insert seat. The seat includes an insert-support surface and side surfaces arranged to engage side edges of the cutting insert when the cutting insert is clamped in the seat. One of the side surfaces is flexible.

2. Prior Art

In a leaflet from ISCAR, entitled "ISCAR's New Clamping System for Profiling Tools" prior art is shown, which is illustrated herein in FIGS. 6 and 7, as well as a further development of prior art, which is illustrated in FIG. 8 herein.

As is seen in FIGS. 6 and 7, in the prior art there is disclosed a three-point abutment. In case the cutting insert S is exposed to a force Fc1 acting from the right, see FIG. 6, the cutting insert S will abut at two points CP1 and CP2 against a stiffer side surface 100 of a holder 102 and at one point CP3 against a more resilient side surface 104. This is illustrated in FIG. 6 by an angle δ1 formed between the cutting insert S and the more resilient side surface.

If the force Fc2 acting on the cutting insert S comes from the left, see FIG. 7, the cutting insert S will abut against the stiffer side surface at one point CP1 and at two points CP3 and CP4 against the more resilient side surface. This is illustrated in FIG. 7 by an angle δ2 formed between the cutting insert S and the stiffer side surface.

Clamping of the cutting insert S is normally effected with a so-called rocking pin 106, possibly in combination with a top clamp. This has turned out to be insufficient in a number of applications, i.e., the position of the cutting insert is not fixed in the holder to a sufficiently high degree of accuracy. This is particularly valid for this elongated type of cutting insert where large movements of the insert occurs if the cutting insert is exposed to varying loads from differing directions, which is the case during, for instance, copy turning.

As is seen in the prior art illustrated in FIG. 8, the insert seat is provided with a self-adjusting wedge W which abuts against a side surface of the cutting insert, the wedge being movable and self-adjusting to the cutting insert so that a four-point abutment CP1, CP2, CP3, CP4 is obtained. Since the self-adjusting wedge is movable, the fixation of the cutting insert in the insert seat will also in this case be inadequate for certain applications.

A turning tool having a replaceable indexable insert is previously known from DE 37 14 055. In an embodiment of a turning tool according to DE 37 14 055, a flat wedge abutting against the indexable insert is provided with a slot, in which a tightening screw is applied. The flat wedge abuts against the indexable insert at two contact points. The slot has an open end that faces the side of the flat wedge that is free, i.e., is turned outwards. By activating the tightening screw, the slot may be widened, whereby the abutment of the contact points against the indexable insert may be adjusted. A disadvantage of this known turning tool is that if the side surface of the insert seat that is integrated with the turning tool in question is damaged or becomes worn out, the entire turning tool has to be replaced, which is disadvantageous from the point of view of costs. As for the forces being transferred from the indexable insert to the two contact points of the flat wedge, the force is greatest at the contact point which is situated closest to the center of the indexable insert. This force will propagate in the flat wedge and then act on the part of the slot that includes the open end. It is true that a screw is applied in the slot but the arrangement entails that the screw should transmit the force in question only by linear contact with the sidewalls of the slot. Due to the fact that the surface pressure between slot and screw can become exceptionally high, there is an obvious risk that a certain deformation of the flat wedge in contact with the screw may occur.

Aims and Features of the Invention

A primary aim of the present invention is to provide a tool holder of the above-mentioned kind, where an exceptionally accurate fixing of the cutting insert in the insert seat is obtained, notwithstanding the fact that the cutting insert is exposed to varying loads and/or loading directions during, for instance, copy turning. The consequence of this is increased dimensional precision during use of the tool holder.

Yet another aim of the present invention is to ensure that the cutting insert is fixed in the insert seat by means of a so-called four-point abutment.

Another aim of the present invention is to ensure that certain readjustments of the insert seat should be possible in connection with wear of the same.

SUMMARY OF THE INVENTION

The present invention relates to a tool holder for mounting a cutting insert for chip removing machining. The holder comprises a head on which is disposed an insert seat that includes an insert-support surface. A plate-shaped member is detachably mounted on the head and includes first and second fingers. The fingers include respective first and second side surfaces forming a recess therebetween. The first and second side surfaces are arranged in upstanding relationship with the insert-support surface to define therewith the seat. The first finger includes a slot and is thus rendered flexible, wherein the first side surface is elastically displaceable relative to the second side surface. Each of the first and second side surfaces includes a recess formed therein at a location intermediate opposite ends of the respective first and second side surfaces, wherein each of the first and second side surfaces defines spaced-apart contact areas. The through-slot includes a cavity receiving a screw which is adjustable to displace the first side surface.

Preferably, the plate-shaped member includes a first surface facing a second surface of the tool holder. The first and second surfaces include serrations disposed in meshing relationship, except at a location permitting the first finger to be elastically displaced relative to the second finger.

BRIEF DESCRIPTION OF THE DRAWINGS

Below a preferred embodiment of the tool holder according to the present invention will be described, reference being made to the accompanying drawings.

DETAILED DESCRIPTION OF PREFERRED EMBODIMENTS OF THE INVENTION

Figure 1:
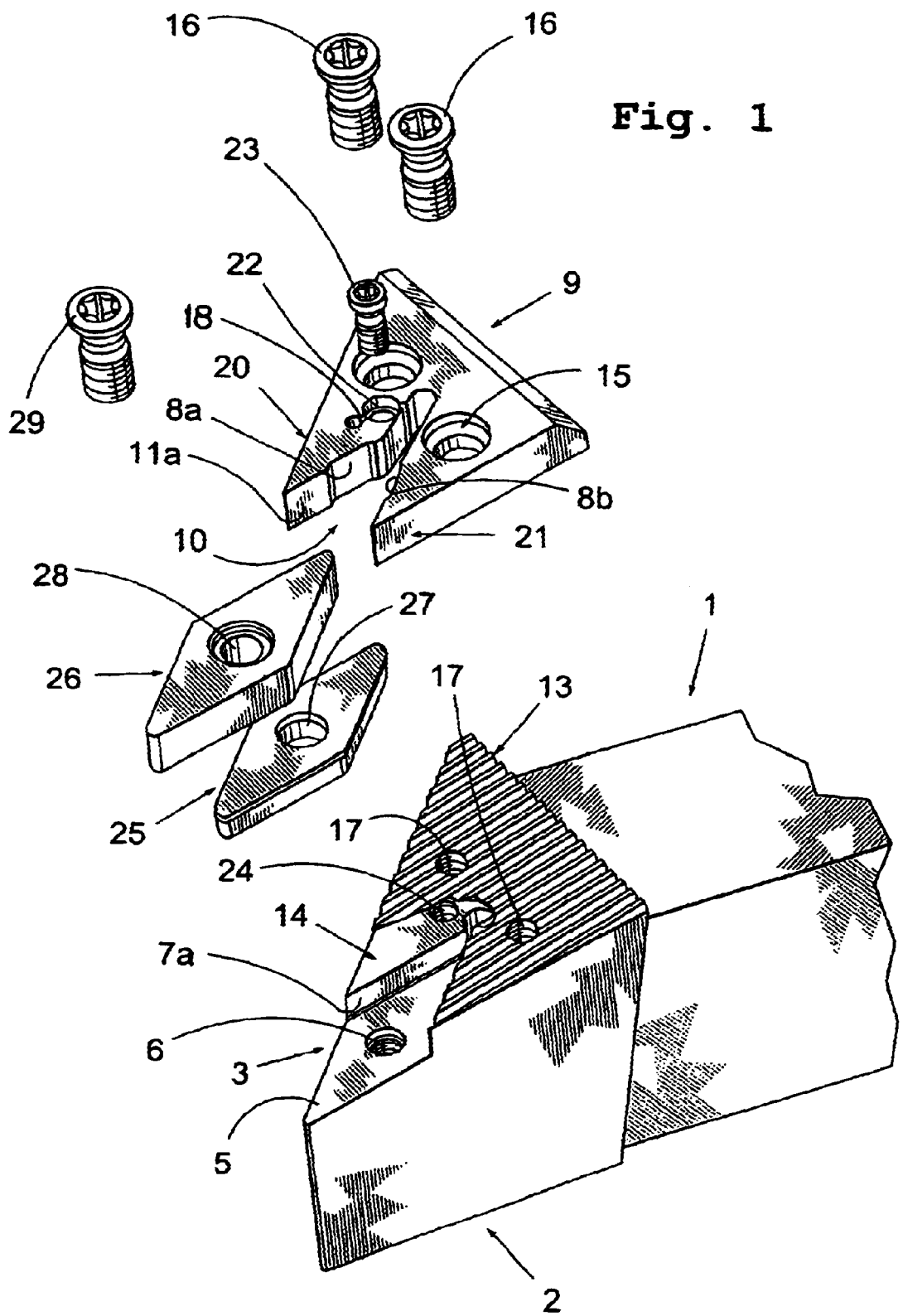
FIG. 1 shows in perspective an exploded view of a tool holder according to the present invention as well as a cutting insert with a shim that are intended to be received in the tool holder.

The tool holder according to the present invention illustrated in FIG. 1 comprises a shaft 1, which at one end thereof has a head or base body 2. Disposed on the body is an insert seat 3 that defines an insert fixing position. The head 2 comprises a bottom surface 5, a first internally threaded center hole (first hole) 6 situated in the bottom surface 5, a first side surface 7a and a second side surface 7b. The tool holder according to the invention also comprises a detachable insert seat plate 9, which has a main recess 10 defined by a third side surface 11a and a fourth side surface 11b. Each of the side surfaces 11a and 11b features a secondary recess 8a, 8b wherein each of the side surfaces 11a and 11b defines two spaced-apart contact areas, see also the description below in connection with FIG. 4. The side surfaces 11a and 11b define between themselves an acute angle. In addition to the recess 10, the insert seat plate 9 has, as seen in top view, a shape that corresponds to the shape of the part of the head 2 that the insert seat plate 9 is intended to be mounted on.

Figure 2:
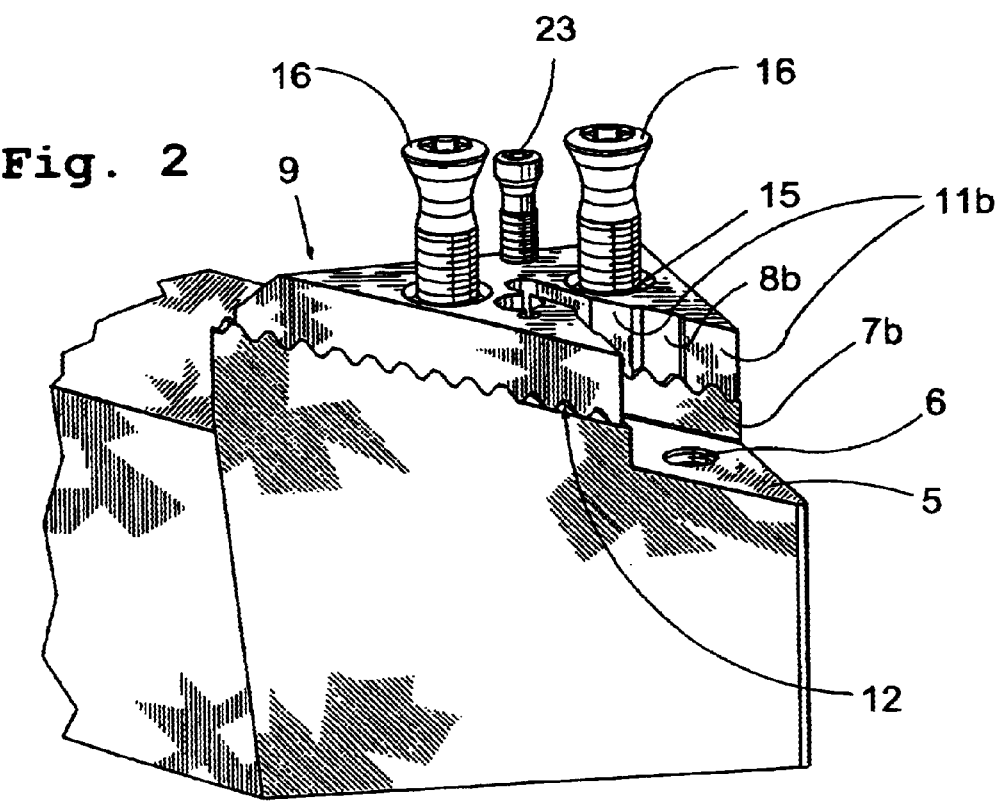
FIG. 2 shows a perspective view of the tool holder from a direction other than that of FIG. 1.

As is seen in FIG. 2, the insert seat plate 9 is provided with first serrations 12 on the side thereof facing towards the head 2. The first serrations 12, in the mounted position of the insert seat plate 9 on the head 2, generally extend in the longitudinal direction of the shaft 1.

As is seen in FIG. 1, the major part of the portion of the head 2 that is intended to receive the insert seat plate 9 is provided with second serrations 13, which generally also extend in the longitudinal direction of the shaft 1. A smaller portion 14 of the head 2 situated adjacent to the first side surface 7a, is not provided with serrations, the reason for this being explained below. As is seen in FIG. 2, the first serrations 12 and the second serrations 13 mesh with each other when the insert seat plate 9 is mounted on the head 2.

Figure 3:
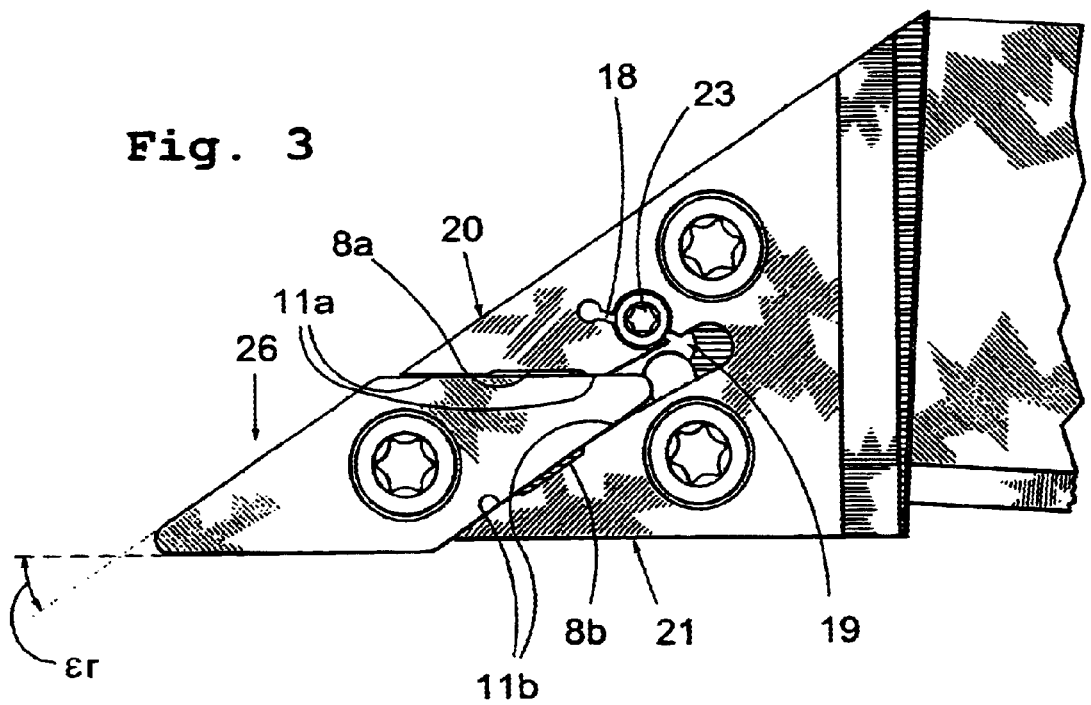
FIG. 3 shows a planar view of ahead of the tool holder according to the present invention, a cutting insert being mounted in an insert seat of the head.

As is seen in FIGS. 1–3, the insert seat plate 9 is provided with a number of through holes (second holes) 15, in which first screws 16 are intended to be received in order to anchor the insert seat plate 9 against the head 2. For this purpose, the head 2 is provided with a number of internally threaded third holes 17, which in the mounted position of the insert seat plate 9 on the head 2 are just opposite the second holes 15. In FIG. 2 is shown how the first screws 16 are about to be applied in the second holes 15. When the first screws 16 are finally applied in the third holes 17, the first and second serrations 12 and 13 are in engagement with each other, whereby an exceptionally safe and accurate anchorage of the insert seat plate 9 is achieved on the head 2, i.e., the anchorage has an extraordinarily good ability to transmit forces between the insert seat plate 9 and the head 2. In the embodiment illustrated, the insert seat plate 9 has two second holes 15 and the head 2 is correspondingly provided with two third holes 17.

As is most clearly seen in FIG. 3, the insert seat plate 9 is provided with a slot 18, which ports into a notch 19, which, in turn, ports into, and forms an extension of, the recess 10. Both the slot 18 and the notch 19 extend the entire vertical height of the insert seat plate 9 and thus constitute a through-slot and a through-notch, respectively. A first finger-like portion 20 and a second finger-like portion 21 are defined by the recess 10 and the notch 19, which are centrally situated in the insert seat plate 9. The slot 18 is situated in the first finger-like portion 20, the slot 18 generally having an extension transverse to the longitudinal direction of the first finger-like portion 20. As is most clearly seen in FIG. 1, an intermediate portion of the slot 18 is provided with a through-cavity 22, which is intended to receive a second screw 23. The cavity 22 is wider than the slot 18 and provided with a conical countersink which houses a conical head of the second screw 23 when the same is in an active position, i.e., when the second threaded portion of the screw 23 is received in a fourth, internally threaded hole 24.

When the insert seat plate 9 is being mounted on the head 2, a shim 25 can be brought into abutment against the bottom surface 5. Then, the indexable insert 26 is applied, which thereby rests on an insert-support surface defined by the shim 25, by which it is ensured that a first center hole 27 in the shim 25 is generally aligned with a second center hole 28 in the indexable insert 26, but the first center hole 27 is preferably somewhat displaced in relation to the second center hole 28, which is explained below. The insert seat 3 is thus formed by the side surfaces 11a and 11b, and the insert-support surface defined by the shim.

The shim 25 and the indexable insert 26 are fixed by a third screw 29 extending through the center holes 27 and 28 as well as into the center hole 6 in the bottom surface 5. Thereby, the indexable insert 26 is anchored in the recess 10 of the insert seat plate 9 in a satisfactory way, the indexable insert 26 abutting both against the third side surface 11a and the fourth side surface 11b of the insert seat plate 9. Preferably, the cutting insert 26 has a height, which equals the height of the insert seat plate 9.

The cutting insert 26 illustrated in the described embodiment is a rhombic cutting insert which is intended for copy turning. In that connection, it is suitable that the angle $\epsilon_r$ illustrated in FIG. 3 is in the interval $30° < \epsilon_r < 60°$.

The design of the insert seat plate 9 permits readjustment of the position of the third side surface 11a. In this connection, it should be observed that due to the presence of the non-serrated portion 14, which is situated adjacent to the third side surface 11a when the insert seat plate 9 is mounted on the head 2 an adjustment of the position of the side surface 11a can be carried out, by activation of the second screw 23 (which cams apart the portions of the seat plate 9 disposed on opposite sides of the slot 18). Thus, the side surface 11a can be displaced by tightening the screw 23. That is possible since the portions of the serrations 12 of the insert seat plate 9 which abut against the non-serrated portion 14 can be displaced in relation to said portion 14, which is plane.

Figure 4:
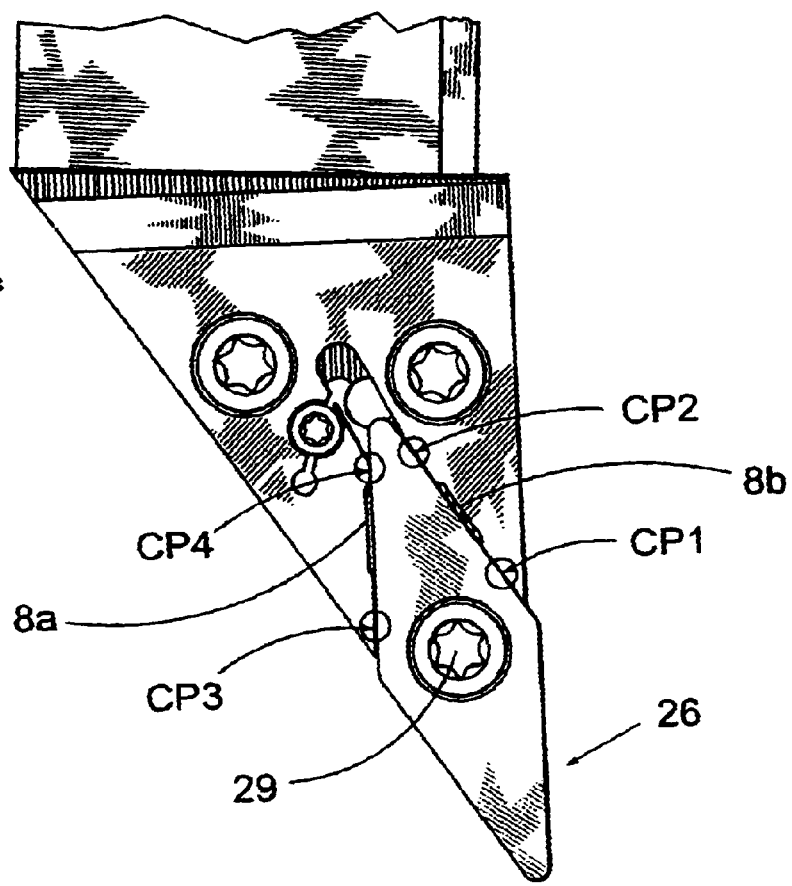
FIG. 4 shows a planar view according to FIG. 3, where the abutment points between the indexable insert and the insert seat are marked in a finally assembled position of the indexable insert.

In order to describe the four-point abutment that is being effected between the indexable insert 26 and the third and fourth side surfaces 11a and 11b, respectively, reference is made to FIG. 4. As is seen in FIG. 4, the four contact points CP1, CP2, CP3 and CP4 between the indexable insert 26 and the third and fourth side surface 11a and 11b, respectively, are indicated.

Figure 5:
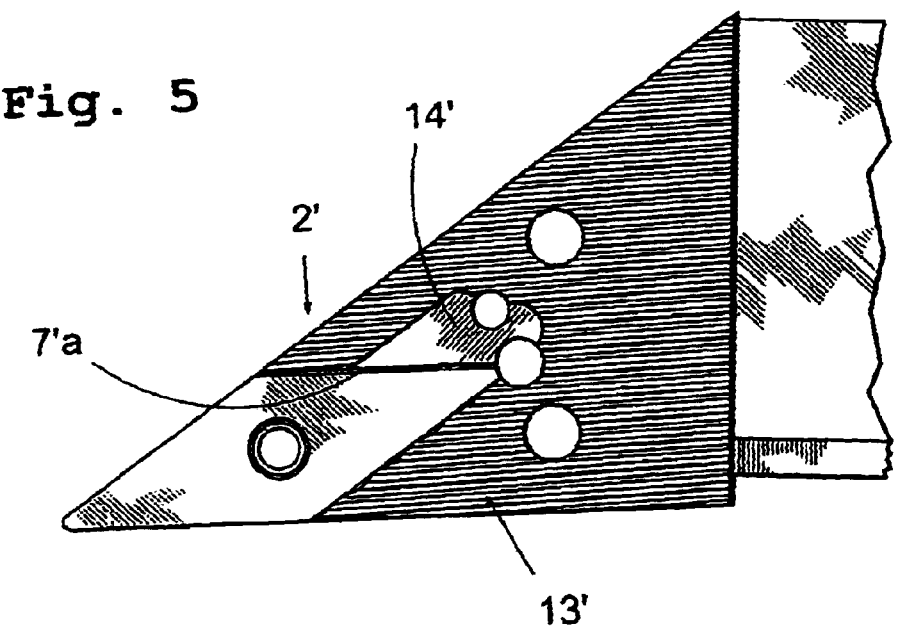
FIG. 5 shows in a planar view an alternative embodiment of ahead, which is intended to co-operate with the insert seat plate.
Figure 6:
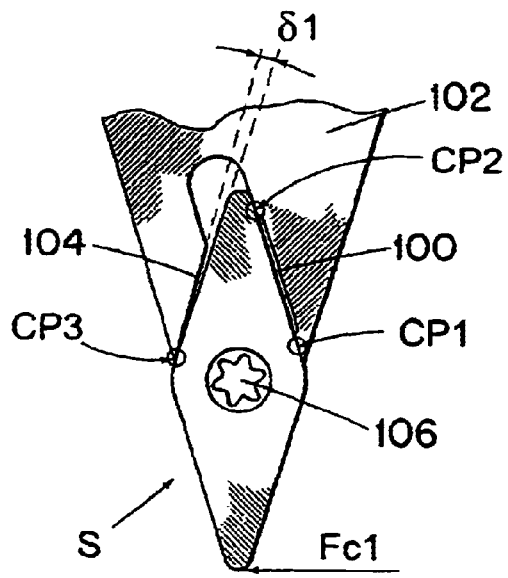
FIG. 6 shows schematically a planar view of prior art, when the cutting insert is exposed to a force, during fastening of a cutting insert in a tool holder.
Figure 7:
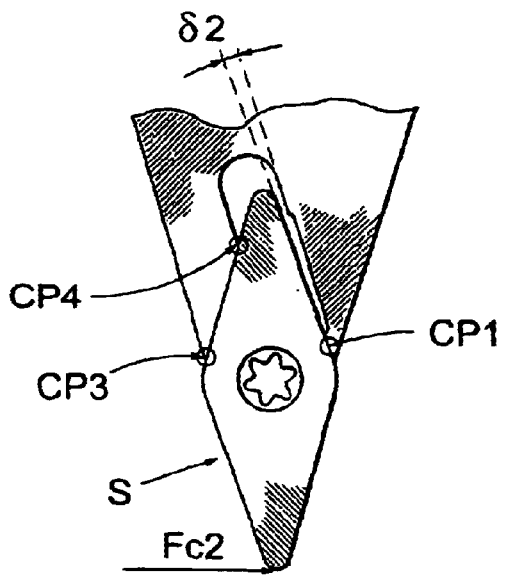
FIG. 7 shows schematically a planar view of the prior art illustrated in FIG. 6, wherein the cutting insert is exposed to a force directed in the opposite direction.
Figure 8:
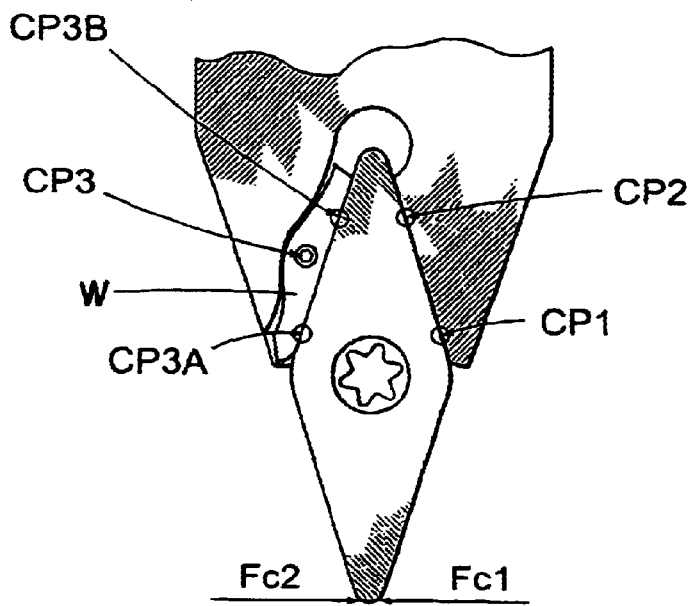
FIG. 8 shows schematically a planar view of a further development of prior art during fastening of a cutting insert in a tool holder.

In order to guarantee that a satisfactory abutment occurs between the cutting insert 26 and the third and fourth side surfaces 11a and 11b, respectively, of the insert seat plate 9, the first center hole 6 in the bottom surface 5 is somewhat offset from the third center hole 28 when the cutting insert 26 is applied into the recess 10 of the insert seat plate 9. That is, the first center hole 6 is situated somewhat further toward the notch 19 than the third center hole 28 in the cutting insert 26 so that an inwardly directed prestressing force is generated on the cutting insert 26 when the same, by means of the third screw 29, is fixed in the recess 10 of the insert seat plate In FIG. 5 an alternative embodiment of a head 2' is shown, where the serrations 13' have a different coverage than of the head 2 which is shown in FIG. 1. Thus, the serrations 13' extend down to the first side surface 7'a, i.e., the non-serrated portion 14' has a more limited extension than in the embodiment of the head 2 according to FIG. 1. However, the insert seat plate 9 also works together with the head 2' illustrated in FIG. 5 since the non-serrated portion 14' is situated under the slot 18 in the insert seat plate 9, i.e., readjustment of the position for the third side surface 11a may be carried out since the part of the insert seat plate 9 abutting against the non-serrated portion 14' may be displaced by activation of the second screw 23.

Feasible Modifications of the Invention

In the above-described embodiments, a portion 14, 14 of the head is non-serrated while the portion abutting against said portion 14; 14' of the insert seat plate 9 is provided with serrations 12. However, within the scope of the present invention, it is feasible that the portion 14, 14' has serrations, but the portion of the insert seat plate 9 abutting against the portion 14; 14' lacks serrations. Alternatively, both the portion 14, 14' nor the portion of the seat plate 9 opposing the portion 14, 14' could be non-serrated, wherein two plane portions would abut against each other. In this connection, it is important that said portions are not in engagement with each other but rather can be elastically displaced in relation to each other in connection with the second screw 23 being activated.

Even if the arrangement of co-operating longitudinal serrations on the head 2; 2' and the insert seat plate 9 is the preferred embodiment for coupling the plate to the head, there are a large number of alternatives, within the scope of the present invention, in order to bring about the necessary transmission of force between the insert seat plate 9 and the head 2; 2'. For certain types of application, the serrations may be entirely dispensed with, i.e., it is sufficient with a screw joint to transmit forces between the insert seat plate 9 and the head 2; 2', i.e., the surfaces of the insert seat plate 9 and the head 2; 2' abutting against each other are in principle plane.

According to an additional alternative, it is feasible that the serrations are supplemented with pins, which bridge the interface between the insert seat plate 9 and the head 2; 2'. The pins have, in that connection, the purpose of absorbing forces which act in the longitudinal direction of the serrations, whereby the accuracy regarding the mutual position orientation between the insert seat plate 9 and the head 2; 2' is improved.

The serrations may also be formed in such a way that the same are arranged criss-cross, i.e., they form a check or waffle pattern. Thereby, the serrations may absorb forces in two directions perpendicular to each other, also in this case the accuracy regarding the mutual positioning between the insert seat plate 9 and the head 2; 2' being improved.

An additionally alternative way to achieve the force-transmitted co-operation between the head and the insert seat plate is by means of a key-groove arrangement, which brings about the requisite transmission of forces between the head and the insert seat plate. All the above examples of devices for providing a force-transmitted co-operation between the insert seat plate 9 and the head 2; 2' are provided as examples but are not intended to limit the scope of the invention.

In the above-described embodiments, the insert seat plate 9 is provided with a slot 18 which ports (opens) into a notch 19 between the finger-like portions 20, 21. However, within the scope of the present invention, it is also feasible that the slot could port for example to the outside of the relevant finger-like portion 20.

In the above-described embodiments, the indexable insert 26 is intended to be anchored in the appurtenant insert seat by means of a third screw 29 that is received in a center hole of the indexable insert 26. However, the principles for the present invention are also applicable to tool holders where the indexable inserts are fixed by means of other members, as an exemplifying and not limiting measure, different types of top clamps may be mentioned.

In the above-described embodiments, a shim 25 defines an insert-support surface. However, within the scope of the present invention, it is also feasible to omit the shim plate, i.e., the bottom surface 5 of the head could be raised to be situated at the same level as the surface of the head 2; 2' that receives the insert seat plate 9, whereby such bottom surface would define the insert-support surface. Accordingly, the insert seat would be defined by the bottom surface 5 and the side surfaces 11a, 11b.

The tool holder according to the present invention is primarily intended for rhombic so-called copying inserts. However, within the scope of the present invention, it is also feasible that the principles for the present invention are applicable to tool holders for triangular and square cutting inserts.

Although the present invention has been described in connection with preferred embodiments thereof, it will be appreciated by those skilled in the art that even further additions, deletions, modifications, and substitutions not specifically described may be made without departing from the spirit and scope of the invention as defined in the appended claims.

What is claimed is:

1. A tool holder for mounting a cutting insert for chip removing machining, comprising:

a head on which is disposed an insert seat including an insert-support surface; and a plate-shaped member detachably mounted on the head and including first and second fingers, the fingers include respective first and second side surfaces forming a main recess therebetween, the first and second side surfaces arranged in upstanding relationship with the insert-support surface, wherein the insert-support surface and the first and second side surfaces form the insert seat, the second finger and the second side surface being rigid, the first finger including a through-slot and being flexible, wherein the first side surface is elastically displaceable relative to the second side surface, at least one of the first and second side surfaces including a secondary recess formed in an intermediate portion thereof, wherein the at least one side surface defines a plurality of spaced-apart contact areas, a through-slot including a cavity receiving a screw which is adjustable to displace to deform the first side surface.

2. The tool holder according to claim 1, wherein the through-slot communicates with a through-notch formed between the first and second fingers.

3. The tool holder according to claim 1, wherein the screw is received in a threaded hole formed in the head.

4. The tool holder according to claim 1, wherein the plate-shaped member includes a first surface facing a second surface of the tool holder, the first and second surfaces including serrations disposed in meshing relationship, except at a location permitting the first finger to be elastically deformed relative to the second finger.

5. A tool holder for mounting a cutting insert for chip removing machining, comprising:
   a head on which is disposed an insert seat including an insert-support surface; and
   a plate-shaped member detachably mounted on the head and including first and second fingers, the fingers include respective first and second side surfaces forming a main recess therebetween, the first and second side surfaces arranged in upstanding relationship with the insert-support surface, wherein the insert-support surface and the first and second side surfaces form the insert seat,
       the first finger including a through-slot and being flexible, wherein the first side surface is elastically displaceable relative to the second side surface,
       at least one of the first and second side surfaces including a secondary recess formed in an intermediate portion thereof, wherein the at least one side surface defines a plurality of spaced-apart contact areas,
       a through-slot including a cavity receiving a screw which is adjustable to displace to deform the first side surface, wherein the through-slot communicates with a through-notch formed between the first and second fingers.

6. The tool holder according to claim 5 wherein the through-notch is defined by an inner portion of the recess.

7. The tool holder according to claim 6 wherein the through-notch extends at an angle with respect to an outer portion of the recess in which the first and second side surfaces are disposed, as the plate-shaped member is viewed in top plan.

8. The tool holder according to claim 7, wherein a portion of the head is non-serrated at the location.

9. The tool holder according to claim 7, wherein a portion of the seat plate is non-serrated at the location.

10. The tool holder according to claim 1 further including a shim mounted on the head and forming the insert-support surface.

11. The tool holder according to claim 1 wherein the cavity is disposed intermediate opposite ends of the through-slot.

12. The tool holder according to claim 1 wherein the first finger further includes a notch forming an extension of the insert seat, the through-slot extending into the notch.

13. The tool holder according to claim 1 wherein the cavity is wider than the through-slot.

14. The tool holder according to claim 1 wherein the at least one side surface comprises both of the first and second side surfaces.

15. A tool holder for mounting a cutting insert for chip removing machining, comprising:
   a head on which is disposed an insert seat including an insert-support surface; and
   a plate-shaped member detachably mounted on the head and including first and second fingers, the fingers include respective first and second side surfaces forming a main recess therebetween, the first and second side surfaces arranged in upstanding relationship with the insert-support surface, wherein the insert-support surface and the first and second side surfaces form the insert seat,
       the first finger including a through-slot and being flexible, wherein the first side surface is elastically displaceable relative to the second side surface,
   at least one of the first and second side surfaces including a secondary recess formed in an intermediate portion thereof, wherein the at least one side surface defines a plurality of spaced-apart contact areas,
   a through-slot including a cavity receiving a screw which is adjustable to displace to deform the first side surface,
       wherein the plate-shaped member includes a first surface facing a second surface of the tool holder, the first and second surfaces including serrations disposed in meshing relationship, except at a location permitting the first finger to be elastically deformed relative to the second finger.

16. A tool holder for mounting a cutting insert for chip removing machining, comprising:
   a head on which is disposed an insert seat including an insert-support surface; and
   a plate-shaped member detachably mounted on the head and including first and second fingers, the fingers include respective first and second side surfaces forming a main recess therebetween, the first and second side surfaces arranged in upstanding relationship with the insert-support surface, wherein the insert-support surface and the first and second side surfaces form the insert seat,
       the first finger including a through-slot and being flexible, wherein the first side surface is elastically displaceable relative to the second side surface,
       at least one of the first and second side surfaces including a secondary recess formed in an intermediate portion thereof, wherein the at least one side surface defines a plurality of spaced-apart contact areas,
       a through-slot including a cavity receiving a screw which is adjustable to displace to deform the first side surface,
       wherein the first finger further includes a notch forming an extension of the insert seat, the through-slot extending into the notch.

* * * * *